(12) United States Patent
Ha

(10) Patent No.: US 12,123,241 B2
(45) Date of Patent: Oct. 22, 2024

(54) HINGE AND TANK OR LOADING FLAP SYSTEM

(71) Applicant: HBPO GmbH, Lippstadt (DE)

(72) Inventor: Insoo Ha, Erwitte (DE)

(73) Assignee: HBPO GmbH, Lippstadt (DE)

( * ) Notice: Subject to any disclaimer, the term of this patent is extended or adjusted under 35 U.S.C. 154(b) by 305 days.

(21) Appl. No.: 17/897,740

(22) Filed: Aug. 29, 2022

(65) Prior Publication Data

US 2023/0061089 A1 Mar. 2, 2023

(30) Foreign Application Priority Data

Sep. 1, 2021 (DE) .......................... 102021122616.3

(51) Int. Cl.
| | |
|---|---|
| *E05F 15/63* | (2015.01) |
| *B60K 15/05* | (2006.01) |
| *B60L 53/16* | (2019.01) |
| *B60K 15/03* | (2006.01) |
| *B60L 58/10* | (2019.01) |
| *E05F 15/75* | (2015.01) |

(52) U.S. Cl.
CPC .............. *E05F 15/63* (2015.01); *B60K 15/05* (2013.01); *B60L 53/16* (2019.02); *B60K 2015/03217* (2013.01); *B60K 2015/053* (2013.01); *B60K 2015/0538* (2013.01); *B60K 2015/0561* (2013.01); *B60L 58/10* (2019.02); *E05F 15/75* (2015.01); *E05Y 2201/626* (2013.01); *E05Y 2400/44* (2013.01); *E05Y 2900/534* (2013.01)

(58) Field of Classification Search
CPC ............ E05F 15/63; B60K 2015/0538; B60K 2015/053; E05Y 2900/534
USPC ........................................................ 296/97.22
See application file for complete search history.

(56) References Cited

U.S. PATENT DOCUMENTS

| | | | | |
|---|---|---|---|---|
| 11,285,805 | B2* | 3/2022 | Yagura .................. | B60K 15/05 |
| 11,927,045 | B2* | 3/2024 | Wietkamp ............. | B60K 15/05 |
| 2022/0024299 | A1* | 1/2022 | Wilke .................... | B60K 15/05 |
| 2024/0083243 | A1* | 3/2024 | Sun ........................ | E05B 83/34 |
| 2024/0132008 | A1* | 4/2024 | Pentia .................... | B60L 53/16 |
| 2024/0159093 | A1* | 5/2024 | Kaneko ................. | B60K 15/05 |
| 2024/0217333 | A1* | 7/2024 | Takemura ............. | B60K 15/05 |
| 2024/0240506 | A1* | 7/2024 | Langkau ............... | H02K 7/116 |
| 2024/0263506 | A1* | 8/2024 | Kaneko ................. | E05F 15/63 |

FOREIGN PATENT DOCUMENTS

DE 102019109713 A1 10/2020

* cited by examiner

*Primary Examiner* — Jason S Morrow
(74) *Attorney, Agent, or Firm* — Laurence P. Colton; Smith Tempel Blaha LLC

(57) ABSTRACT

A hinge for opening and closing a tank or charging flap has two lever arms which are connected to one another in an articulated manner. A first lever arm is designed for connection to a tank or charging flap and a second lever arm is designed for connection to a component fastened to a vehicle. A drive is provided in order to pivot the two lever arms relative to one another about a pivot axis. The drive is an actuator that is received on or in one of the lever arms.

16 Claims, 3 Drawing Sheets

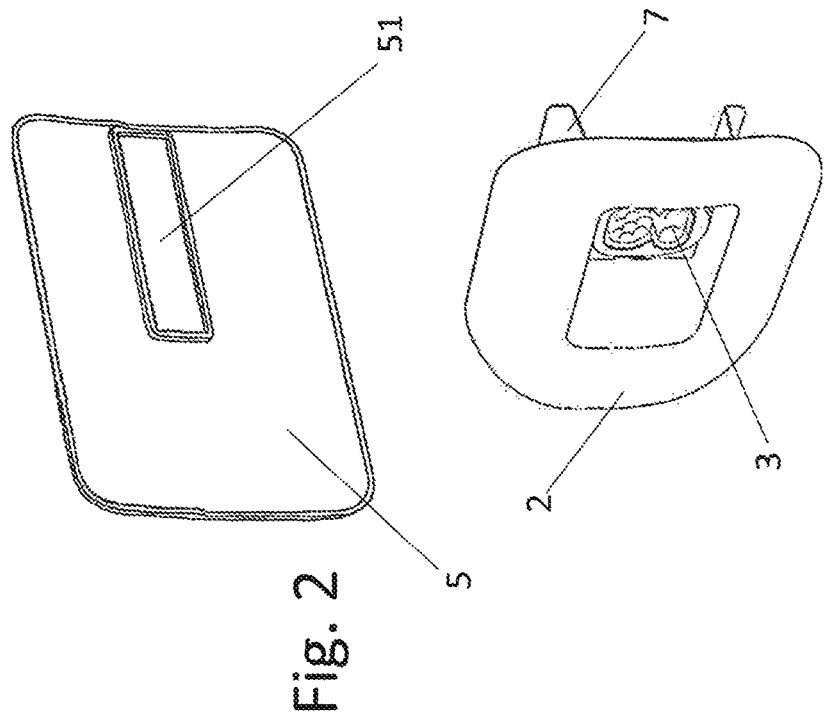
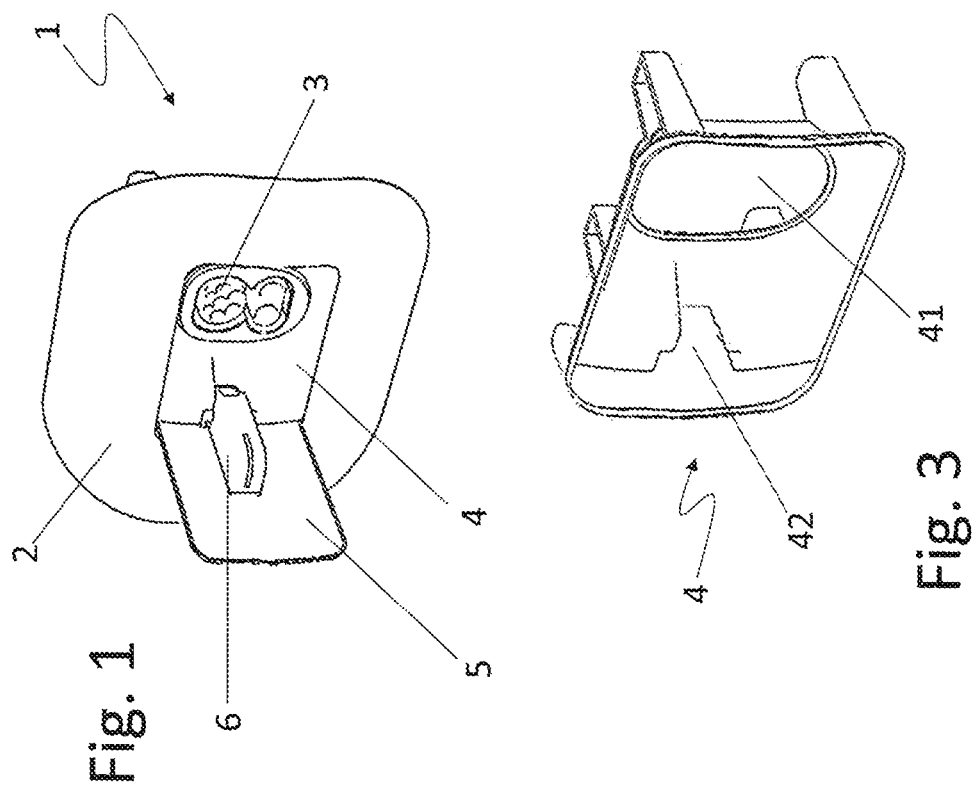

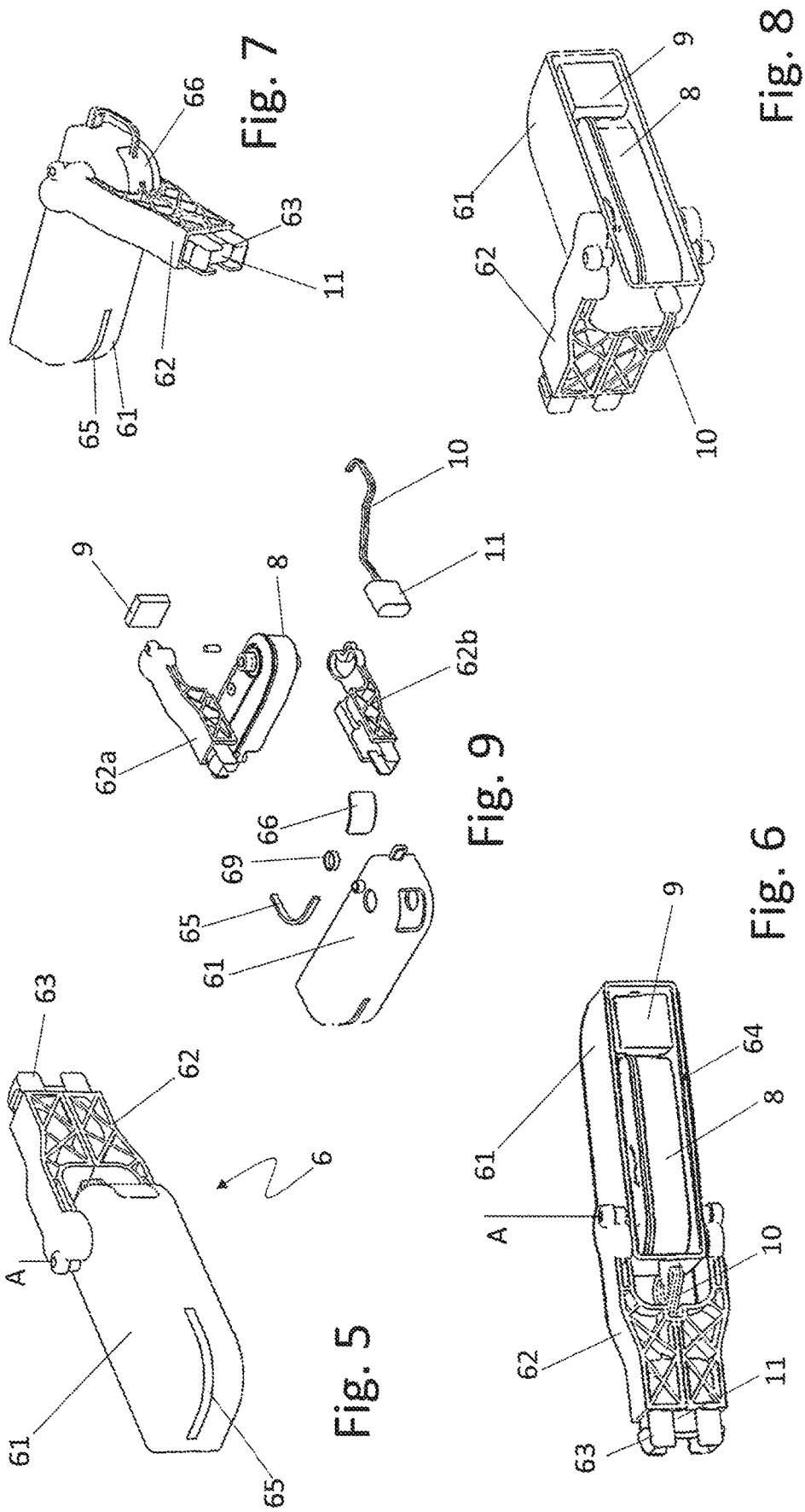

HINGE AND TANK OR LOADING FLAP SYSTEM

CROSS REFERENCE TO RELATED APPLICATIONS

This patent application claims the benefit of and priority on German Patent Application No. 10 2021 122 616.3 having a filing date of 1 Sep. 2021.

BACKGROUND OF THE INVENTION

Technical Field

The invention relates to a hinge for opening and closing a tank or charging flap, comprising two lever arms which are connected to one another in an articulated manner, wherein a first lever arm is designed for connection to a tank or charging flap and a second lever arm is designed for connection to a component fastened to a vehicle, wherein a drive is provided in order to pivot the two lever arms relative to one another about a pivot axis.

Prior Art

In motor vehicles, it is generally known to move tank or charging flaps covering a tank filler neck or a vehicle-side socket for receiving a charging cable from a closed position into an open position and vice versa by means of an electric drive. Such a system is disclosed, for example, in DE 10 2019 109 713 A1. Therein, a corresponding tank or charging flap in the form of a cover is brought from a closed position into an open position by means of a linear actuator. The drive used pushes the cover in front of the corresponding tank or charging recess and thus closes the opening.

Furthermore, systems are known in which, for example, complicated levers and gear mechanisms are provided on the inside of the vehicle body, which mechanisms allow the opening or closing of the tank or charging flap by means of a corresponding drive.

The latter systems are very complicated in structure; the first-mentioned system, in particular, has visual disadvantages, because the displacement mechanism is at the expense of the joint pattern that is created between the tank or charging flap and the rest of the vehicle body.

BRIEF SUMMARY OF THE INVENTION

The object of the present invention is therefore to create a hinge and a corresponding tank or charging flap system that does not have the disadvantages mentioned and also allows the integration of further advantageous functions.

This object is achieved by a hinge for opening and closing a tank or charging flap, comprising two lever arms which are connected to one another in an articulated manner, wherein a first lever arm is designed for connection to a tank or charging flap and a second lever arm is designed for connection to a component fastened to a vehicle, wherein a drive is provided in order to pivot the two lever arms relative to one another about a pivot axis, characterized in that the drive is an actuator that is received on or in one of the lever arms, and by a tank or charging flap system having these features, as taught in the independent claims. Advantageous embodiments can be found in the respective dependent claims.

The hinge according to the invention for opening and closing a tank or charging flap has two lever arms which are connected to one another in an articulated manner, wherein a first lever arm is designed for connection to a tank or charging flap and a second lever arm is designed for connection to a component fastened to a vehicle. In this case, a drive is provided in order to pivot the two lever arms relative to one another about a pivot axis. According to the invention, this drive is an actuator which is received on or in one of the lever arms.

Complex mechanisms within the vehicle are thus completely eliminated. In particular, this also allows vehicle-side standardization in the region of the tank or charging socket, where otherwise the demands in terms of rigidity or strength and the resulting development effort are very high. This also significantly reduces the vehicle-side effort required when making modifications. In addition, due to the integration of the actuator, the electrically operated hinge can be installed on or inside the hinge(s) from the outside, which significantly reduces the overall installation effort.

Provision is preferably made for the actuator received in or on one lever arm to comprise a rotary drive that engages with the other lever arm, in particular via a clutch and/or a gear wheel. Of course, the hinge according to the invention can have more than two lever arms. Due to the rotary drive of the actuator, the rotary movement on a lever arm can be converted directly into the pivoting movement of the lever arm engaged with the lever arm.

According to a preferred embodiment, the second lever arm comprises a clutch portion, in particular a clip, for engaging with a component fastened to a vehicle. During assembly, said clutch portion then only has to be inserted into a corresponding receptacle. In the embodiment as a clip, this also takes place entirely without the need for tools, whereby the latching function of the clip also signals acoustically that the component has been properly installed.

In addition, it can be provided that a plug is arranged in the region of the clutch portion, which plug is designed for engaging with a vehicle-fixed counter-element and is electrically connected to the drive. This has the advantage that, when the hinge is mounted, for example via the latching function described above, electrical contact is made between the actuator and the vehicle electrical system at the same time. This also makes assembly easier.

Since the hinge is already electrified in the manner described above, it makes sense to accommodate further functions on or in at least one of the lever arms. For example, at least one sensor, in particular a touch or environmental sensor or a radar device, and/or at least one charging or filling level indicator and/or at least one lamp and/or a heating element can be arranged on or in at least one of the lever arms. These functions are helpful because, on the one hand, operating safety is improved and, on the other hand, the user can obtain valuable information about the charging or filling level. In addition, this solution is highly integrative, since the functions mentioned are all integrated in the hinge, so that no additional installation space is required to accommodate them. In addition, lighting systems in particular also support operation while charging or refueling.

Furthermore, the invention relates to a tank or charging flap system comprising a tank or charging flap and a hinge (as described above) attached thereto. This tank or charging flap system can be modularized.

For example, it can be provided that the tank or charging flap system according to the invention further comprises a tank or charging recess to be connected to a vehicle and having an opening for a charging plug or a tank filler neck as well as a receptacle in which a lever arm of the hinge is attached or is to be attached. Depending on the type of vehicle, these components can be adapted accordingly, wherein the tank or charging flap and the corresponding tank or charging recess are provided according to the vehicle type. The hinge can then be a standard component that is then connected to the corresponding tank or charging flaps and to the tank or charging recesses.

The choice of material is generally not limited. At least the tank or charging flap and/or one or both lever arms and/or the tank or charging recess can be made of a plastics material and/or metal material, in particular steel material and/or aluminum material and/or cast material.

According to an advantageous embodiment, it is provided that at least one lock is arranged on the tank or charging flap. This lock can be moved from an open position into a locking position by means of the actuator or an additional actuator attached on or in the hinge or the tank or charging flap. This allows the tank or charging flap on the vehicle body to be locked in the closed position so that the system can be protected against unauthorized access by third parties. A linear actuator is preferably provided, which can move the lock between an unlocked position and a locked position.

BRIEF DESCRIPTION OF THE DRAWINGS

The invention will be explained in more detail in the following with reference to FIGS. 1 to 12.

FIG. 1 is a perspective view of a tank or charging flap system according to the invention.

FIG. 2 is a perspective view of a tank or charging flap viewed from the inside.

FIG. 3 is a perspective view of a tank or charging recess.

FIG. 4 is a perspective view of a vehicle body part and a vehicle-side socket arranged behind it.

FIG. 5 is a perspective view of a hinge according to the invention in an open position.

FIG. 6 is a further perspective view of the hinge shown in FIG. 5.

FIG. 7 is a perspective view of the hinge shown in FIGS. 5 and 6 in a closed position.

FIG. 8 is a further perspective view of the hinge according to the invention in a closed position.

FIG. 9 is an exploded view of a hinge according to the invention and of components accommodated therein or thereon.

DETAILED DESCRIPTION OF PREFERRED EMBODIMENTS

Figure 11:
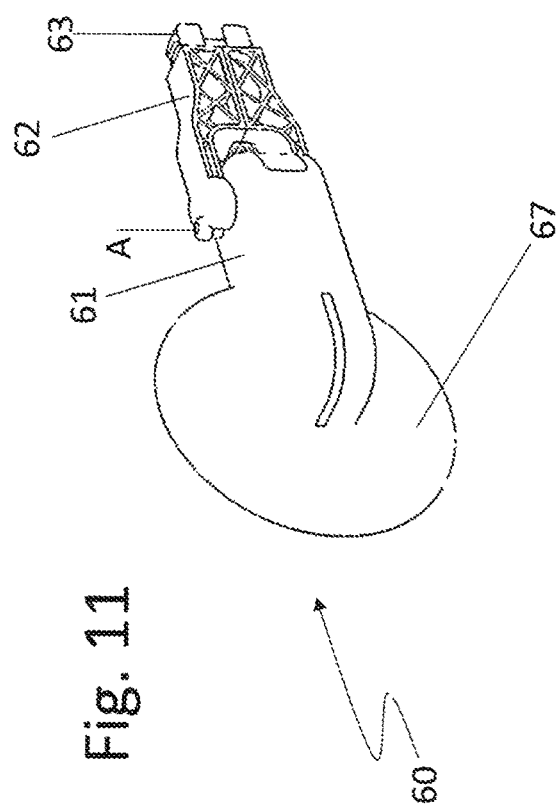
FIG. 11 is a perspective view of a further embodiment of a hinge according to the invention.
Figure 12:
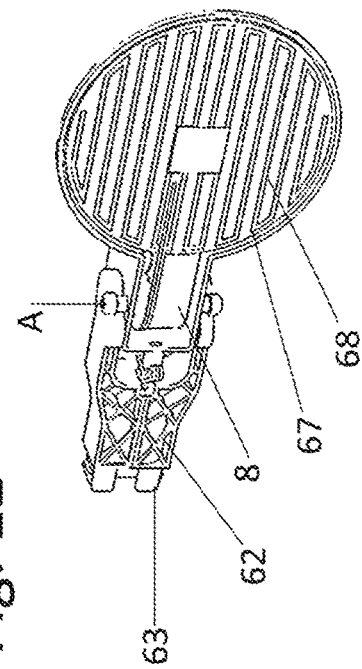
FIG. 12 is a further perspective view of the hinge shown in FIG. 11.

FIGS. 1 to 4 show the basic structure of a tank or charging flap system 1 according to the invention using the example of a charging flap system. The following description can also be read to apply to a tank flap system in the same way. The charging flap then corresponds to a tank flap, the charging recess to a tank recess and the charging plug 3 to a fuel filler neck.

The system 1 is usually installed in the region of a fender. The reference sign 2 designates a section of the body of a vehicle, behind which there is a charging socket 3 that is connected to a corresponding rechargeable battery in the vehicle. The charging plug 3 is located in a charging recess 4 that is basically a component installed on the inside of the vehicle body 2. The charging plug 3 is usually fixed to the vehicle structure located behind the vehicle body 2 or to a component 7 attached to the vehicle structure, FIG. 4. As shown in FIG. 3, such a charging recess 4 comprises, for example, an opening 41 through which the charging socket 3 extends and a receptacle 42 for receiving a hinge 6 that connects the charging recess to the charging flap 5. The charging flap 2 is connected to the hinge 6 and has a connecting portion 51 for this purpose, FIG. 2.

The hinge 6 according to the invention is shown in more detail in FIGS. 5 to 9 in a first embodiment. It comprises (cf. FIGS. 5 and 6) at least two lever arms; a first lever arm 61 that can be connected to the charging flap 3 and a second lever arm 62 that is connected to the first arm 61 so as to be pivoted about a pivot axis A. A clutch portion 63 is attached to the free end of the second lever arm 62 and can preferably be introduced as a clip or plug into the receptacle 42 of the charging recess 4 (cf. FIG. 3). In addition to the mechanical clutch, the clutch portion 63 can also comprise an electrical clutch in the form of a plug 11 which, when the clutch portion 63 is inserted into the receptacle 42 of the charging recess 4, simultaneously establishes an electrical connection to the electrical system of the vehicle. As can be seen from FIG. 6, the lever arm 61 comprises a receptacle 64 in which an actuator 8 is accommodated. Via an electrical connection 10, for example a cable, said actuator is connected to the plug 11 and, if properly installed in a charging recess 4, to the electrical system of the vehicle. In this way, the actuator 8 can be supplied with voltage. This actuator 8 preferably comprises a rotary drive that ensures that the lever arm 61 is pivoted relative to the lever arm 62 when the actuator 8 is actuated. FIGS. 5 and 6 show the open position of the hinge 6, and FIGS. 7 and 8 show the closed position in which the charging flap fits into the joint pattern of the vehicle body.

The exploded view in FIG. 9 makes it clear once again that, if there is a voltage supply in the hinge, said voltage supply can be used not only to actuate the actuator 8 but also to supply power or transport data to other components. For example, a sensor 9 can be arranged, for example, in the receptacle 64, and can have different functions, for example radar functions, and/or can be designed as a touch or environmental sensor.

Furthermore, lights or indicators 65, 66, 69 can also be provided in one of the lever arms 61, 62 that can also be designed, for example, as a charging or filling level indicator 65, or floor lighting 69 or lighting 66 of the charging recess 4. Structurally, the lever arm 62 can be composed of two halves 62a and 62b, as can be seen in the exploded view in FIG. 9. This allows simpler assembly of the hinge 6 according to the invention.

Figure 10:
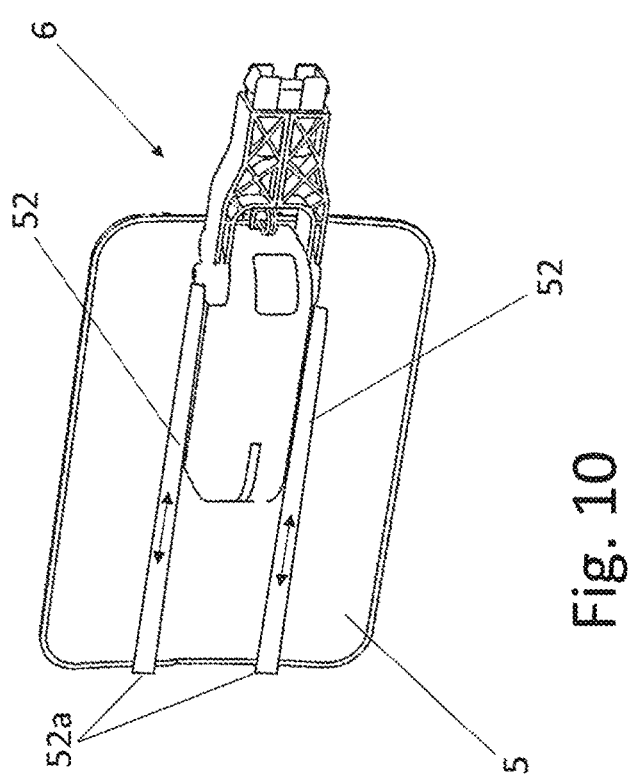
FIG. 10 shows a specific embodiment of the hinge according to the invention and a tank or charging flap attached thereto.

As shown in FIG. 10, the charging flap 5 according to the invention can itself have additional electrical functions due to the electrical voltage supply of the hinge 6. For example, a lock 52 that can be displaced in the direction of the double arrow, in the example shown there are preferably two such locks 52, can be provided, which locks can be displaced via the actuator 8 in the hinge 6 or a separate actuator (not shown). In a locking position, the free ends 52a of the hinges shown then engage behind the inside of the vehicle body or behind a corresponding lock receptacle (not shown). Of course, the locks do not have to be in the form of linearly displaceable components; rotary latches or locks capable of a rotary movement are also conceivable.

Finally, the hinge according to the invention can also be provided with further functions. A further embodiment of the hinge 60 according to the invention is shown in FIGS. 11 and 12, which differs from the hinge shown in FIGS. 5 to 8 in that a heating device 68 is also located in a corresponding housing extension 67 in the region of the first lever arm 61. Other functions, in particular the functions mentioned above including the actuator 8, can also be accommodated in this housing extension 67. The heating device 68 serves primarily to allow the charging flap 5 to be opened even in frost situations in which the charging flap 2 may be frozen in and thus immobile.

The hinge 6, 60 according to the invention allows a high level of integration of various functions that are required or needed in the region of the tank or charging flap of a motor vehicle. The hinge can also be designed as a standardized component so that it can then be connected to a charging or tank recess and a charging or tank flap and ultimately to the vehicle structure as part of a modular system. In this way, the hinge according to the invention can also be produced in large numbers, regardless of the vehicle type.

What is claimed is:

1. A hinge (6, 60) for opening and closing a tank or charging flap (5), comprising two lever arms (61, 62) which are connected to one another in an articulated manner, wherein a first lever arm (61) is designed for connection to a tank or charging flap (5) and a second lever arm (62) is designed for connection to a component (4) fastened to a vehicle, wherein a drive (8) is provided in order to pivot the two lever arms (61, 62) relative to one another about a pivot axis (A), and wherein the drive (8) is an actuator that is received on or in one of the lever arms (61, 62).

2. The hinge (6, 60) according to claim 1, wherein the actuator (8) received in or on one lever arm (61) comprises a rotary drive that engages with the other lever arm (62).

3. The hinge (6, 60) according to claim 1, wherein the second lever arm (62) comprises a clutch portion (63) for engaging with a component fastened to a vehicle.

4. The hinge (6, 60) according to claim 3, further comprising a plug (11) arranged in the region of the clutch portion (63), which plug is designed for engaging with a vehicle-fixed counter-element and is electrically (10) connected to the drive (8).

5. The hinge (6, 60) according to claim 1, further comprising at least one sensor (9), namely a touch or environmental sensor or a radar device, and/or at least one charging or filling level indicator (65) and/or at least one lamp (66, 69) and/or a heating element (68) is/are arranged on or in at least one (61) of the lever arms.

6. A tank or charging flap system (1), comprising a tank or charging flap (5) and a hinge (6, 60) attached thereto, the hinge (6, 60) being for opening and closing a tank or charging flap (5), the hinge (6, 60) comprising two lever arms (61, 62) which are connected to one another in an articulated manner, wherein a first lever arm (61) is designed for connection to a tank or charging flap (5) and a second lever arm (62) is designed for connection to a component (4) fastened to a vehicle, wherein a drive (8) is provided in order to pivot the two lever arms (61, 62) relative to one another about a pivot axis (A), and wherein the drive (8) is an actuator that is received on or in one of the lever arms (61, 62).

7. The tank or charging flap system (1) according to claim 6, further comprising at least one lock (52) arranged on the tank or charging flap (5), which at least one lock (52) is moveable from an open position into a locking position.

8. The tank or charging flap system (1) according to claim 6, wherein at least the tank or charging flap (5) and/or one or both lever arms (61, 62) and/or the tank or the component (4) are made of a plastics material.

9. The tank or charging flap system (1) according to claim 6, wherein the component (4) is a charging recess having an opening (41) for a charging plug (3) or a tank filler neck as well as a receptacle (42) in which a lever arm (62) of the hinge is attached or is to be attached.

10. The tank or charging flap system (1) according to claim 9, wherein at least the tank or charging flap (5) and/or one or both lever arms (61, 62) and/or the tank or charging recess are made of a plastics material.

11. The hinge (6, 60) according to claim 2, wherein rotary drive engages with the other lever arm (62) via a clutch and/or a gear wheel.

12. The hinge (6, 60) according to claim 3, wherein the clutch portion (63) is a clip.

13. The tank or charging flap system (1) according to claim 6, wherein at least the tank or charging flap (5) and/or one or both lever arms (61, 62) and/or the tank or the component (4) are made of a metal material.

14. The tank or charging flap system (1) according to claim 13, wherein metal material is selected from the group consisting of steel, aluminum, and cast material.

15. The tank or charging flap system (1) according to claim 9, wherein at least the tank or charging flap (5) and/or one or both lever arms (61, 62) and/or the tank or charging recess are made of a metal material.

16. The tank or charging flap system (1) according to claim 15, wherein the metal material is selected from the group consisting of steel, aluminum, and cast material.

* * * * *